(12) United States Patent
Horng et al.

(10) Patent No.: US 8,974,195 B2
(45) Date of Patent: *Mar. 10, 2015

(54) FAN

(75) Inventors: Alex Horng, Kaohsiung (TW); Ko-Chien Wang, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 759 days.

This patent is subject to a terminal disclaimer.

(21) Appl. No.: 13/197,014

(22) Filed: Aug. 3, 2011

(65) Prior Publication Data

US 2013/0011255 A1 Jan. 10, 2013

(30) Foreign Application Priority Data

Jul. 4, 2011 (TW) .............................. 100123575 A

(51) Int. Cl.
| | |
|---|---|
| *F04B 35/04* | (2006.01) |
| *F04B 17/00* | (2006.01) |
| *F04D 29/44* | (2006.01) |
| *F04D 29/54* | (2006.01) |
| *F04D 25/06* | (2006.01) |
| *F04D 17/04* | (2006.01) |
| *G06F 1/20* | (2006.01) |

(52) U.S. Cl.
CPC ............ *F04D 25/0613* (2013.01); *F04D 17/04* (2013.01); *G06F 1/203* (2013.01)
USPC ..................... 417/423.1; 417/410.1; 415/203; 415/205

(58) Field of Classification Search
USPC ............... 417/423.5, 14, 423.1, 423.7, 423.9; 415/203, 204, 205, 53.1, 54.1
See application file for complete search history.

(56) References Cited

U.S. PATENT DOCUMENTS

| | | | |
|---|---|---|---|
| 5,879,141 A * | 3/1999 | Yokozawa et al. | ......... 417/423.7 |
| 6,210,101 B1 | 4/2001 | Horng | |
| 6,561,759 B1 | 5/2003 | Muschelknautz | |
| 7,207,779 B2 | 4/2007 | Horng et al. | |
| 7,255,532 B2 * | 8/2007 | Zheng | ........................... 415/183 |
| 2004/0123459 A1 * | 7/2004 | Makinson et al. | ......... 29/889.23 |

FOREIGN PATENT DOCUMENTS

TW 553323 U 9/2003

* cited by examiner

*Primary Examiner* — Charles Freay
*Assistant Examiner* — Lilya Pekarskaya
(74) *Attorney, Agent, or Firm* — Alan D. Kamrath; Kamrath IP Lawfirm, P.A.

(57) ABSTRACT

A fan includes a housing and a motor. The housing has a compartment, at least one lateral air inlet and at least one lateral air outlet. The lateral air inlet and lateral air outlet communicate with the compartment. The motor has a stator and an impeller. The impeller is coupled with the stator and includes a hub and a plurality of blades coupled with a top face of the hub. Each blade has first and second ends. The first ends of the blades face outwards, and the second ends of the blades define an air-guiding room encompassed by a virtual geometric pattern formed by a virtual line linking the second ends of the blades. The virtual geometric pattern has a maximal diameter. A gap is formed between the second ends of two adjacent blades. The gap is smaller than the maximal diameter of the virtual geometric pattern.

16 Claims, 11 Drawing Sheets

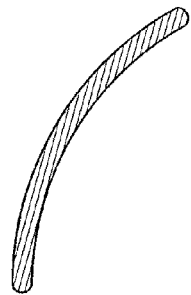
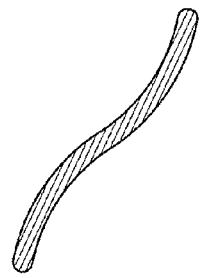
FIG. 10a	FIG. 10b
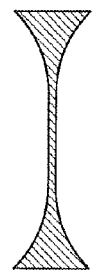
FIG. 10c	FIG. 10d
FIG. 10e

FAN

BACKGROUND OF THE INVENTION

1. Field of the Invention

The invention generally relates to a fan and, more particularly, to a fan that can drive air in a radial direction of an impeller thereof.

2. Description of the Related Art

Conventional cooling fans are mainly categorized into two types: an axial-flow type and a blower type. The axial-flow type cooling fan has an axial air inlet and an axial air outlet opposite to the axial air inlet. Air can be drawn via the axial air inlet and then expelled via the axial air outlet. The blower type cooling fan has an axial air inlet in the axial direction, as well as a radial air outlet in the radial direction thereof. Thus, air can be drawn via the axial air inlet and then expelled via the radial air outlet for a cooling operation.

However, the axial-flow type cooling fan must be mounted on a top of an electronic device to be cooled, such as on the top of a Central Processing Unit (CPU) of a computer. This is because the axial-flow type cooling fan can only expel air in the axial direction rather than the radial direction when performing the desired cooling operation. Therefore, the electronic device will have a higher axial height when the axial-flow type cooling fan is mounted thereon. In addition, since the blower type cooling fan draws air via the axial air inlet (in an axial direction) and expels air via the radial air outlet (in a radial direction), the blower type cooling fan cannot be applied to electronic devices that require drawing air from a lateral side thereof (from the radial direction), such as a handset or a Personal Digital Assistant (PDA).

In light of the problems, a conventional fan capable of drawing and expelling air in a radial direction of an impeller was proposed for those electronic devices that require drawing air from the lateral side. Referring to FIG. 1, a conventional fan 8 is disclosed by Taiwan Patent No. 553323 entitled "Fan Structure Having Horizontal Convection". The conventional fan 8 includes a housing 81 and an impeller 82. The housing 81 is a hollow housing consisting of at least one air inlet 811, at least one air outlet 812, and a radial air channel 813 arranged between the at least one air inlet 811 and the at least one air outlet 812. The impeller 82 is disposed in the radial air channel 813 and includes a hub 821 having a plurality of blades 822 on an outer circumferential face of the hub 821. In such an arrangement, an air pressure difference results between the at least one air inlet 811 and the at least one air outlet 812 when the impeller 82 rotates. The air pressure difference causes air advection between the at least one air inlet 811 and the at least one air outlet 812 for a cooling purpose.

However, when the blades 822 of the impeller 82 cause air to pass through the radial air channel 813, the airflow will be blocked by the hub 821 of the impeller 82 located in the radial air channel 813. Thus, turbulence is caused, and the cooling efficiency of the conventional fan 8 is therefore lowered.

Referring to FIG. 2, Taiwan Patent No. 477492 discloses another conventional fan 9 comprising a rotor seat 91, an impeller 92 and a housing 93. The rotor seat 91 has a plurality of flanges 911, and the impeller 92 has a plurality of grooves 921 engaged with the flanges 911 of the rotor seat 91. The housing 93 can receive the rotor seat 91 and the impeller 92, and has an air inlet 931 and an air outlet 932. In such an arrangement, the impeller 92 can draw air into the housing 93 via the air inlet 931 and expel air via the air outlet 932.

However, the rotor seat 91 and the impeller 92 are also located in an air channel between the air inlet 931 and the air outlet 932. Thus, the airflow caused by the impeller 92 will also be blocked by the rotor seat 91, which causes turbulence. Furthermore, the rotor seat 91 and the impeller 92 are independent components and therefore require assembly. However, it is troublesome to assemble the rotor seat 91 and the impeller 92.

SUMMARY OF THE INVENTION

The primary objective of this invention is to provide a fan capable of preventing the airflow from being blocked by a hub of an impeller thereof when the impeller drives air in a radial direction.

The invention discloses a fan including a housing and a motor. The housing has a compartment, at least one lateral air inlet and at least one lateral air outlet. The at least one lateral air inlet and the at least one lateral air outlet communicate with the compartment, and the housing is closed at the top and the bottom. The motor is received in the compartment and has a stator and an impeller. The impeller is rotatably coupled with the stator and includes a hub and a plurality of blades coupled with a top face of the hub. Each of the blades has a first end and a second end arranged in a radial direction of the impeller. The first ends of the blades face outwards, and the second ends of the blades jointly define an air-guiding room encompassed by a virtual geometric pattern formed by a virtual line linking the second ends of the blades together. The virtual geometric pattern has a maximal diameter. A gap is formed between the second ends of adjacent two of the blades. The gap is smaller than the maximal diameter of the virtual geometric pattern.

BRIEF DESCRIPTION OF THE DRAWINGS

The present invention will become more fully understood from the detailed description given herein below and the accompanying drawings which are given by way of illustration only, and thus are not limitative of the present invention, and wherein:

FIGS. 10a to 10e show different implementations of blades of the fan of the invention.

Figure 1:
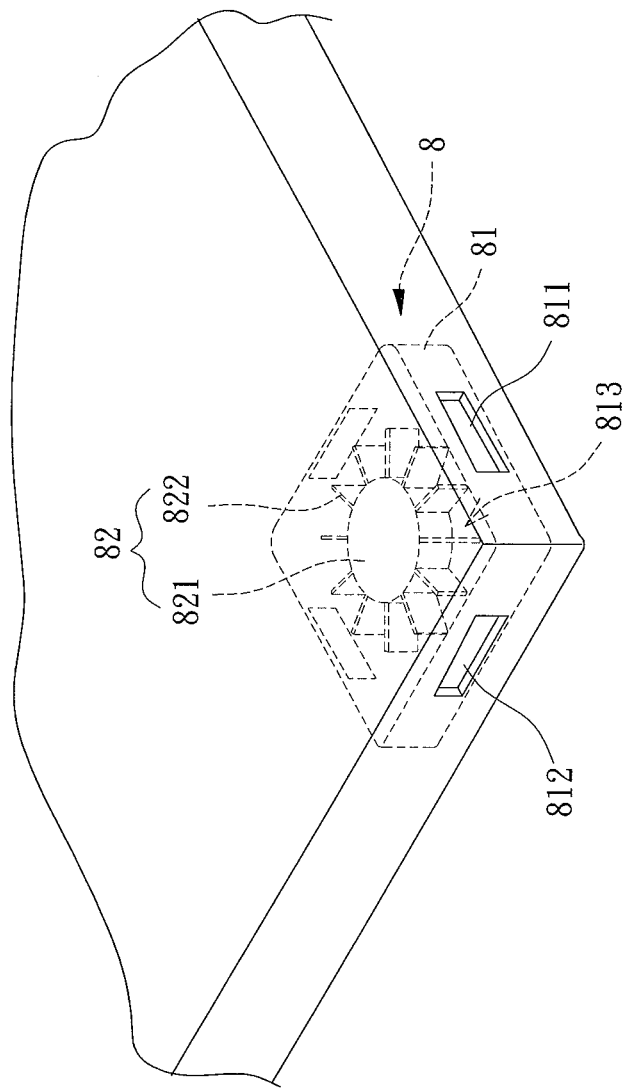
FIG. 1 shows a conventional fan installed in an electronic device.
Figure 2:
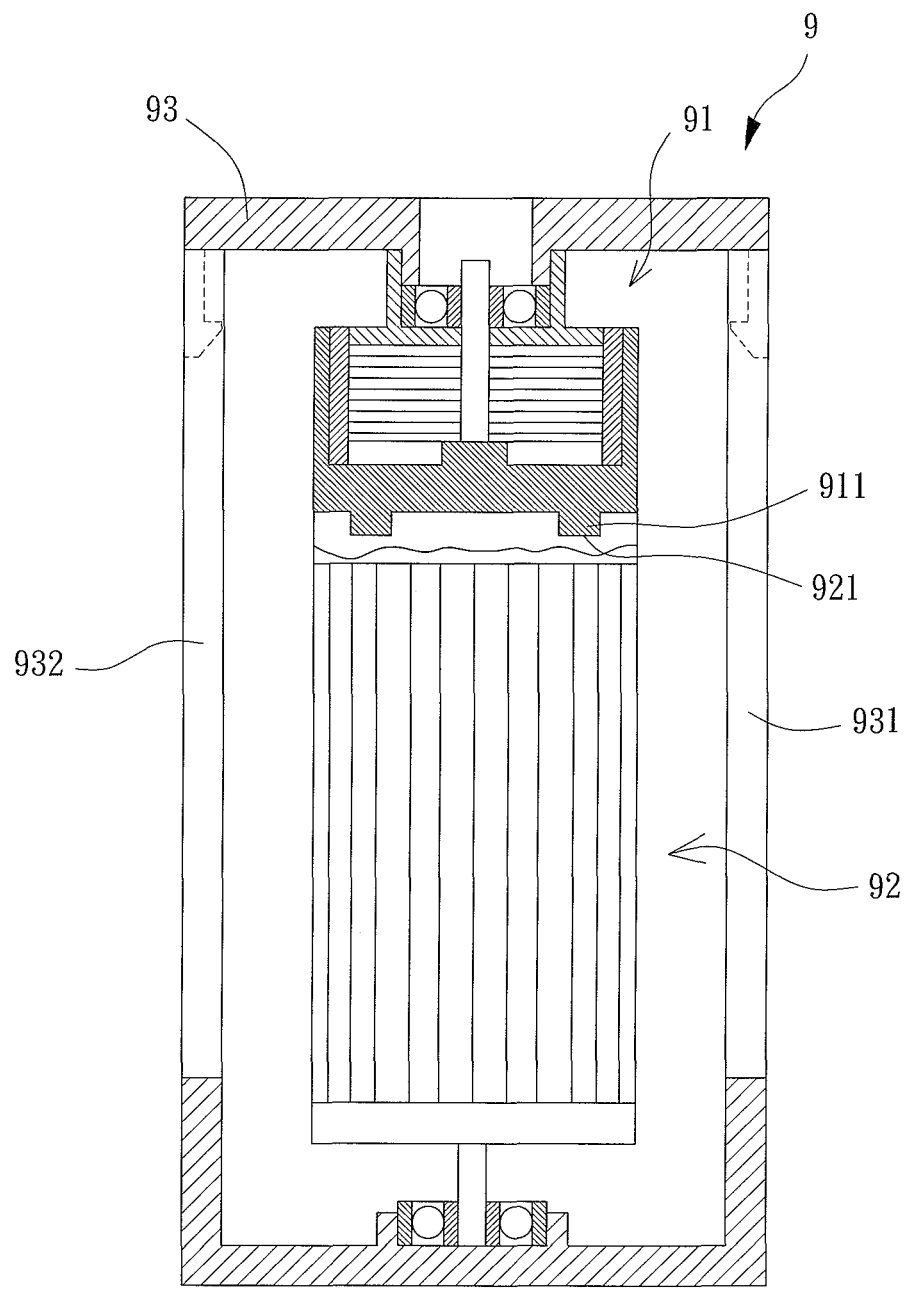
FIG. 2 is a cross sectional view of another conventional fan.

All figures are drawn for ease of explaining the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions conforming to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "inner", "end", "portion", "section", "top", "bottom", "axial", "radial", "spacing", and similar terms are used herein, it should be understood that these terms refer only to the structure shown in the drawings as it would appear to a person viewing the drawings, and are utilized only to facilitate describing the invention.

DETAILED DESCRIPTION OF THE INVENTION

Figure 3:
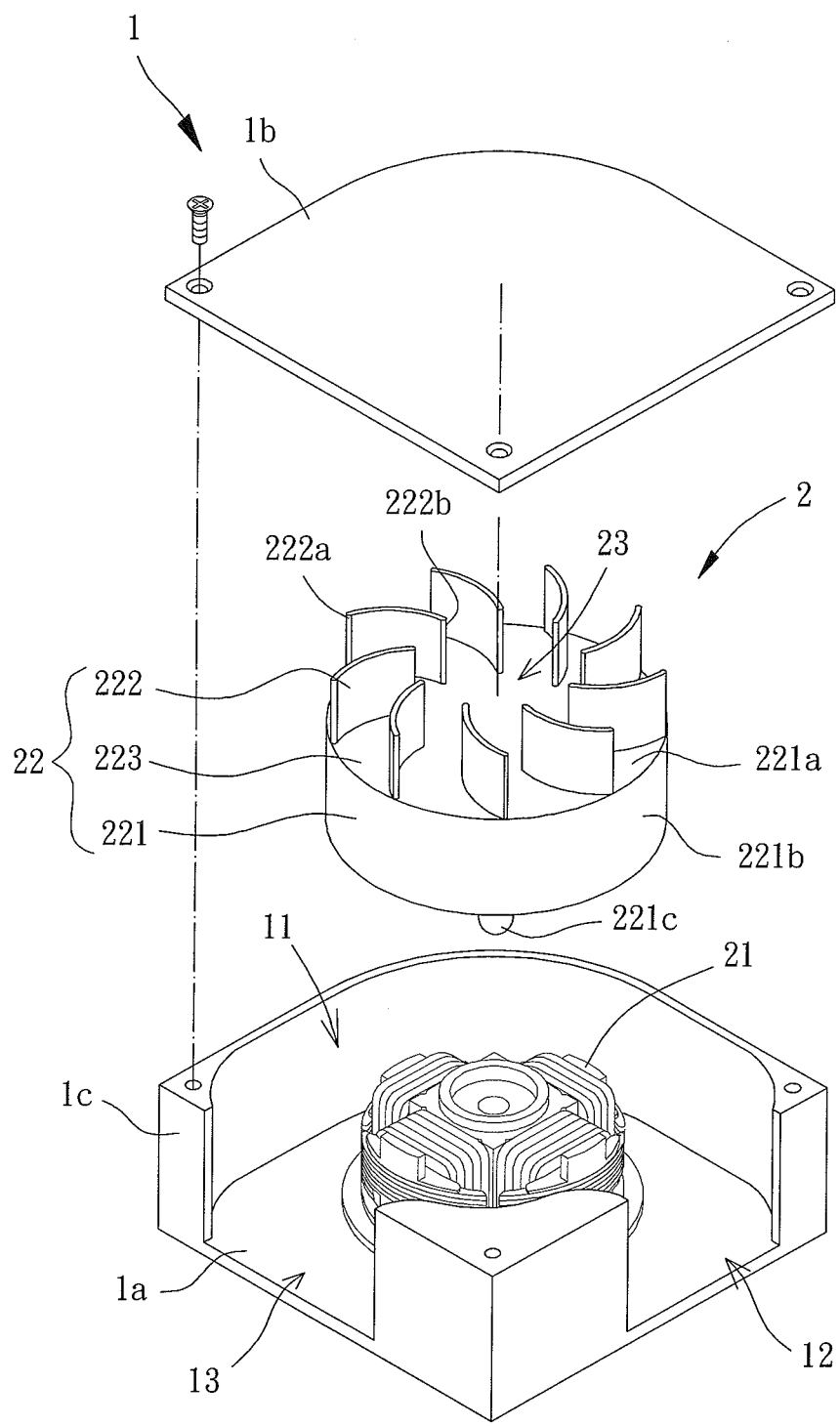
FIG. 3 is an exploded view of a fan according to a first embodiment of the invention.
Figure 4:
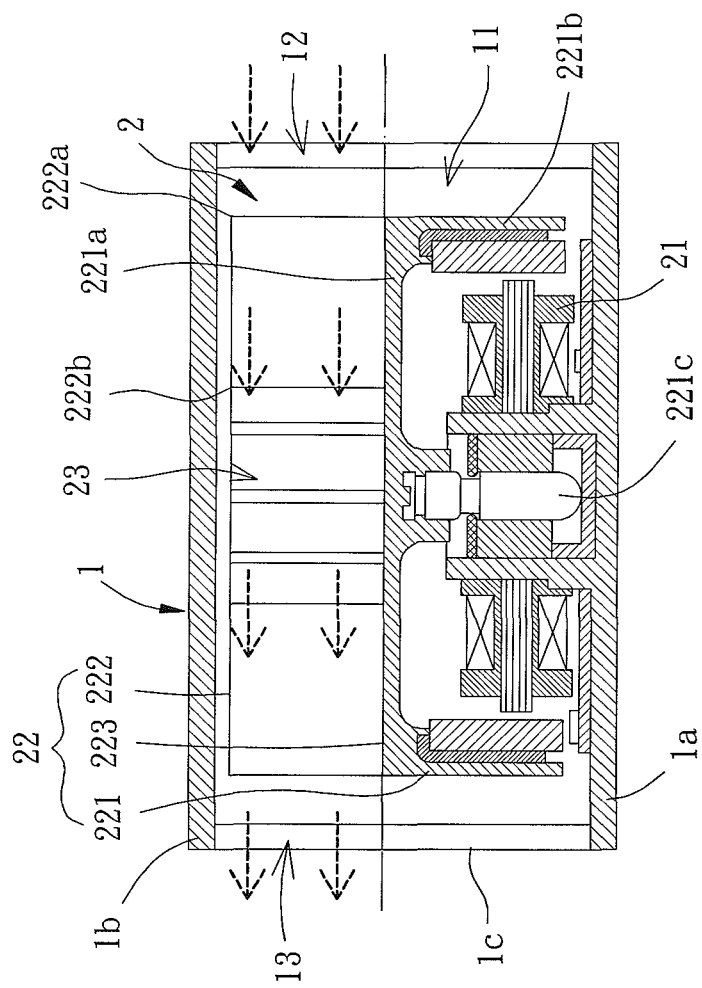
FIG. 4 is a cross-sectional view of the fan of the first embodiment of the invention.

Referring to FIGS. 3 and 4, a fan comprising a housing 1 and a motor 2 is disclosed according to a first embodiment of the invention. The housing 1 can receive the motor 2 and allow air to pass therethrough in a radial direction.

The housing 1 has closed top and bottom ends and comprises a support portion 1a, a cover portion 1b and a lateral wall portion 1c. The support portion 1a and the cover portion 1b are spaced from and opposite to each other, with the lateral wall portion 1c located between the support portion 1a and the cover portion 1b. The support portion 1a, cover portion 1b and lateral wall portion 1c jointly define a compartment 11. The lateral wall portion 1c has at least one lateral air inlet 12 and at least one lateral air outlet 13, with the at least one lateral air inlet 12 and the at least one lateral air outlet 13 communicating with the compartment 11.

In the embodiment, the support portion 1a is implemented as a base, and the lateral wall portion 1c is implemented as a plurality of lateral walls axially extending from a periphery of the base. The lateral walls of the lateral wall portion 1c are interconnected and have a top edge. The cover portion 1b is implemented as a cover plate coupled with the top edge of the lateral walls, such that the cover plate and the base can jointly define the compartment 11 surrounded by the lateral wall portion 1c. The at least one lateral air inlet 12 and the at least one lateral air outlet 13 are arranged on the lateral walls. Specifically, the at least one lateral air inlet 12 and the at least one lateral air outlet 13 can be respectively arranged on two adjacent lateral walls as shown in FIG. 3 or, alternatively, respectively arranged on two opposing lateral walls.

The motor 2 is disposed in the housing 1 and comprises a stator 21 and an impeller 22 (rotor). The stator 21 can drive the impeller 22 to rotate. The impeller 22 has a hub 221 and a plurality of blades 222 that can be coupled with the hub 221 in an integral manner. The hub 221 has a top face 223 facing the cover portion 1b. The blades 222 are coupled with the hub 221 and extend from the top face 223 of the hub 221 towards the cover portion 1b in an axial direction of the impeller 22. In addition, each blade 222 has a first end 222a and a second end 222b arranged in the radial direction of the impeller 22. The second ends 222b of the blades 222 jointly define an air-guiding room 23 (since the second ends 222b of the blades 222 are not connected to each other).

The stator 21 of the motor 2 is mounted on the support portion 1a of the housing 1 while the hub 221 of the impeller 22 is rotatably coupled to the stator 21. The hub 221 consists of a base plate 221a, a lateral peripheral wall 221b and a shaft 221c. The top face 223 is located on the base plate 221a, the shaft 221c terminates in and extends from the base plate 221a opposite to the top face 223 and the lateral peripheral wall 221b is located on a periphery of the base plate 221a concentric to the shaft 221c. The blades 222 are coupled with the top face 223 as shown in FIG. 3, and the first ends 222a of the blades 222 may be aligned with the periphery of the base plate 221a. In this embodiment, the blades 222 are integrally formed on the top face 223 for convenient assembly.

During operation of the fan, the stator 21 of the motor 2 generates alternating magnetic fields to trigger the rotation of the impeller 22. When the fan is mounted in an electronic device, the blades 222 of the impeller 22 can draw air into the housing 1 via the at least one lateral air inlet 12 and expel air via the at least one lateral air outlet 13 to dissipate the heat generated by a heat source of the electronic device.

The fan of the invention is characterized in the ability to drive air to pass through the at least one lateral air inlet 12 and the at least one lateral air outlet 13 in the radial direction of the impeller 22. Thus, the fan does not necessarily have to be mounted on a top of the heat source. This can lower the axial height of the fan, and the fan can provide a better auxiliary cooling effect for heat sources adjacent to the at least one lateral air outlet 13. Moreover, based on the design that the blades 222 extend from the top face 223 of the hub 221 towards the cover portion 1b, the airflow caused by the impeller 22 can smoothly pass through the at least one lateral air inlet 12 and the at least one lateral air outlet 13 without being blocked by the hub 221. This provides a better cooling efficiency for the electronic device. More importantly, the air-guiding room 23 defined by the second ends 222b of the blades 222 can prevent turbulence from forming when the air passes through the blades 222, thereby improving the overall cooling efficiency of the fan.

Figure 5:
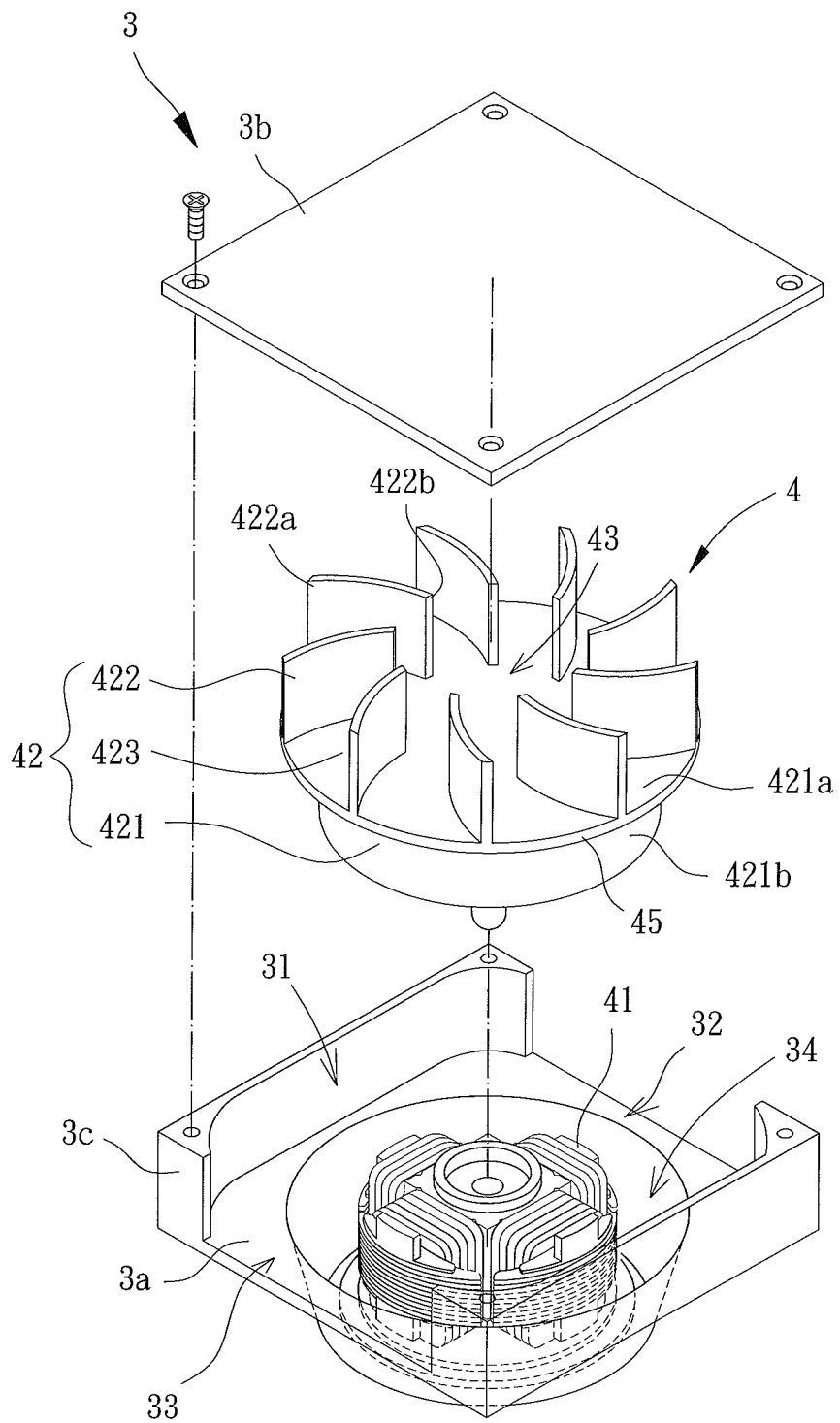
FIG. 5 is an exploded view of a fan according to a second embodiment of the invention.
Figure 6:
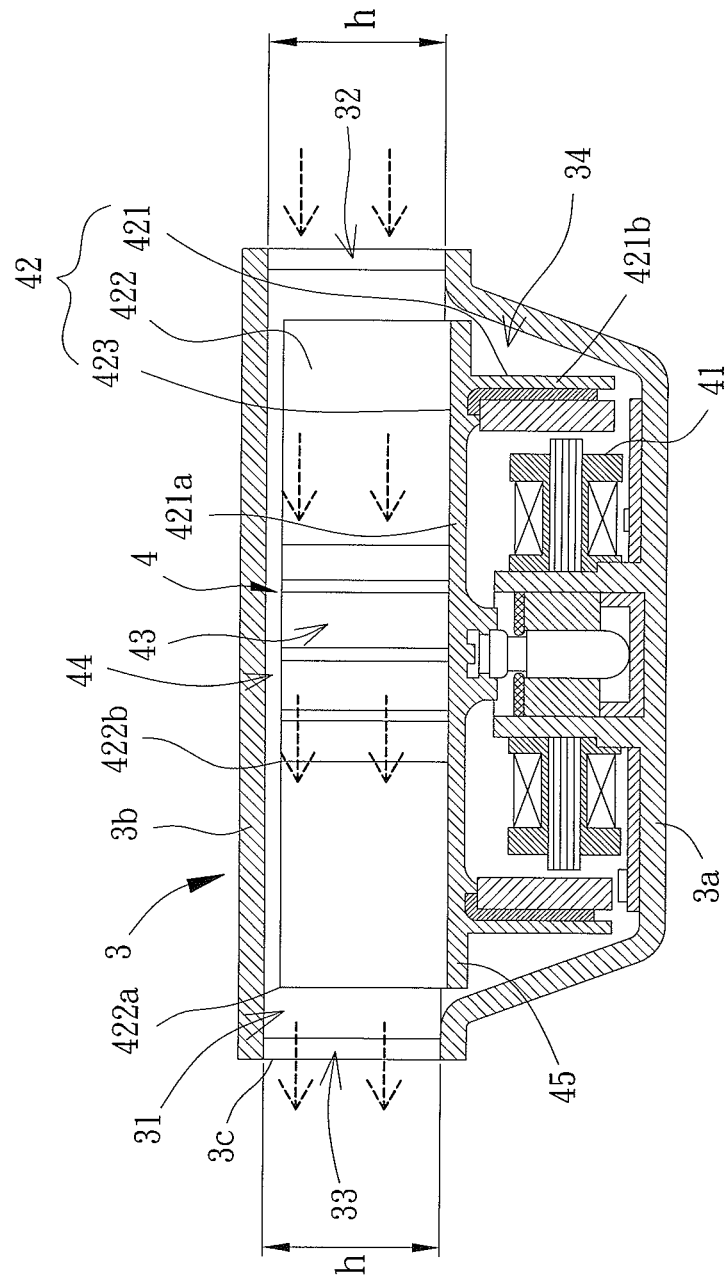
FIG. 6 is a cross-sectional view of the fan of the second embodiment of the invention.

Referring to FIGS. 5 and 6, a fan comprising a housing 3 and a motor 4 is disclosed according to a second embodiment of the invention. Similar to the first embodiment, the housing 3 and the motor 4 also have a support portion 3a, a cover portion 3b, a lateral wall portion 3c, a compartment 31, at least one lateral air inlet 32, at least one lateral air outlet 33, a stator 41, an impeller 42, a hub 421, a base plate 421a, a lateral peripheral wall 421b, a plurality of blades 422, a plurality of first ends 422a, a plurality of second ends 422b, a top face 423 and an air-guiding room 43. The support portion 3a, cover portion 3b, lateral wall portion 3c, compartment 31, at least one lateral air inlet 32, at least one lateral air outlet 33, stator 41, impeller 42, hub 421, base plate 421a, lateral peripheral wall 421b, blades 422, first ends 422a, second ends 422b, top face 423 and air-guiding room 43 of the fan are substantially the same as the support portion 1a, cover portion 1b, lateral wall portion 1c, compartment 11, at least one lateral air inlet 12, at least one lateral air outlet 13, stator 21, impeller 22, hub 221, base plate 221a, lateral peripheral wall 221b, blades 222, first ends 222a, second ends 222b, top face 223 and air-guiding room 23 of the fan of the first embodiment, so they are not described herein again.

Similarly, the support portion 3a is also implemented as a base, the lateral wall portion 3c is implemented as a plurality of lateral walls axially extending from a periphery of the base of the support portion 3a, and the cover portion 3b is implemented as a cover plate. The fan of the second embodiment differs from that of the first embodiment in that the support portion 3a has a chamber 34 at a center thereof in which the hub 421 of the motor 4 is received. In addition, the top face 423 of the impeller 42 and the cover portion 3b may jointly define a radial air channel 44 in which the blades 422 are located. In such an arrangement, the radial air channel 44 merely receives the blades 422, while the at least one lateral air inlet 32 and the at least one lateral air outlet 33 are arranged on two opposing lateral walls of the lateral wall portion 3c. In the axial direction of the impeller 42, both the at least one lateral air inlet 32 and the at least one lateral air outlet 33 have a height H defined by the distance between the cover portion 3b and the top face 423. Therefore, the at least one lateral air inlet 32 and the at least one lateral air outlet 33 can align with the blades 422 of the impeller 42, allowing the hub 421 to be disposed at inner sides of two opposing lateral walls of the lateral wall portion 3c. In such an arrangement, the hub 421 is located outside the radial air channel 44. Therefore, the radial air channel 44 only receives the blades 422. This prevents airflow from being blocked by the hub 421 when the impeller 42 draws air via the at least one lateral air inlet 32, thereby further improving the cooling efficiency of the fan.

Referring to FIG. 6, the blades 422 may also extend outwards towards the lateral wall portion 3c and extend beyond the lateral peripheral wall 421b in the radial direction of the impeller 42. Thus, the blades 422 will have a larger area for an improved air-driving ability. In this case, bottom edges of the blades 422 may be connected together to form a bottom plate 45 coupled with the hub 421. Thus, the structural strength of the blades 422 may be enhanced to improve the air-driving efficiency of the fan.

Figure 7:
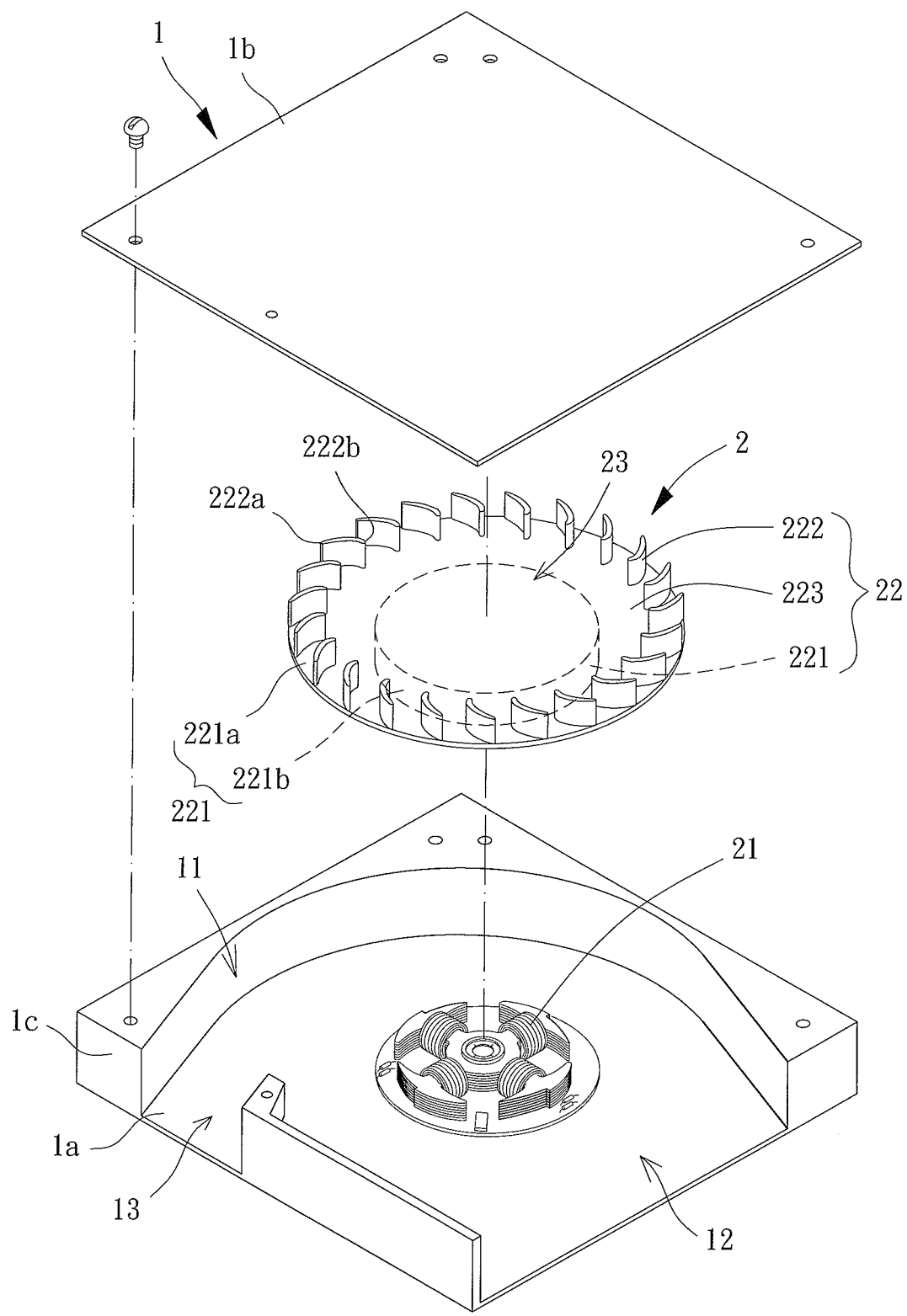
FIG. 7 is an exploded view of a fan with a different design.
Figure 8:
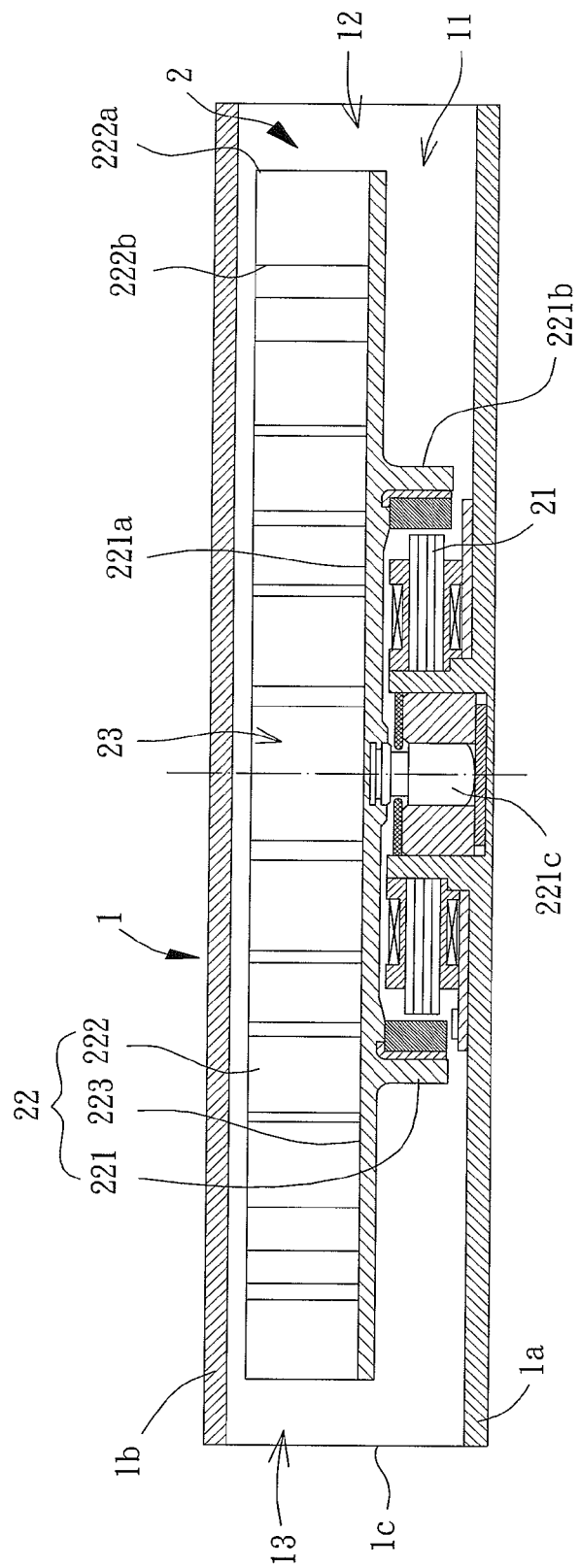
FIG. 8 is a cross-sectional view of the fan with the different design.
Figure 9:
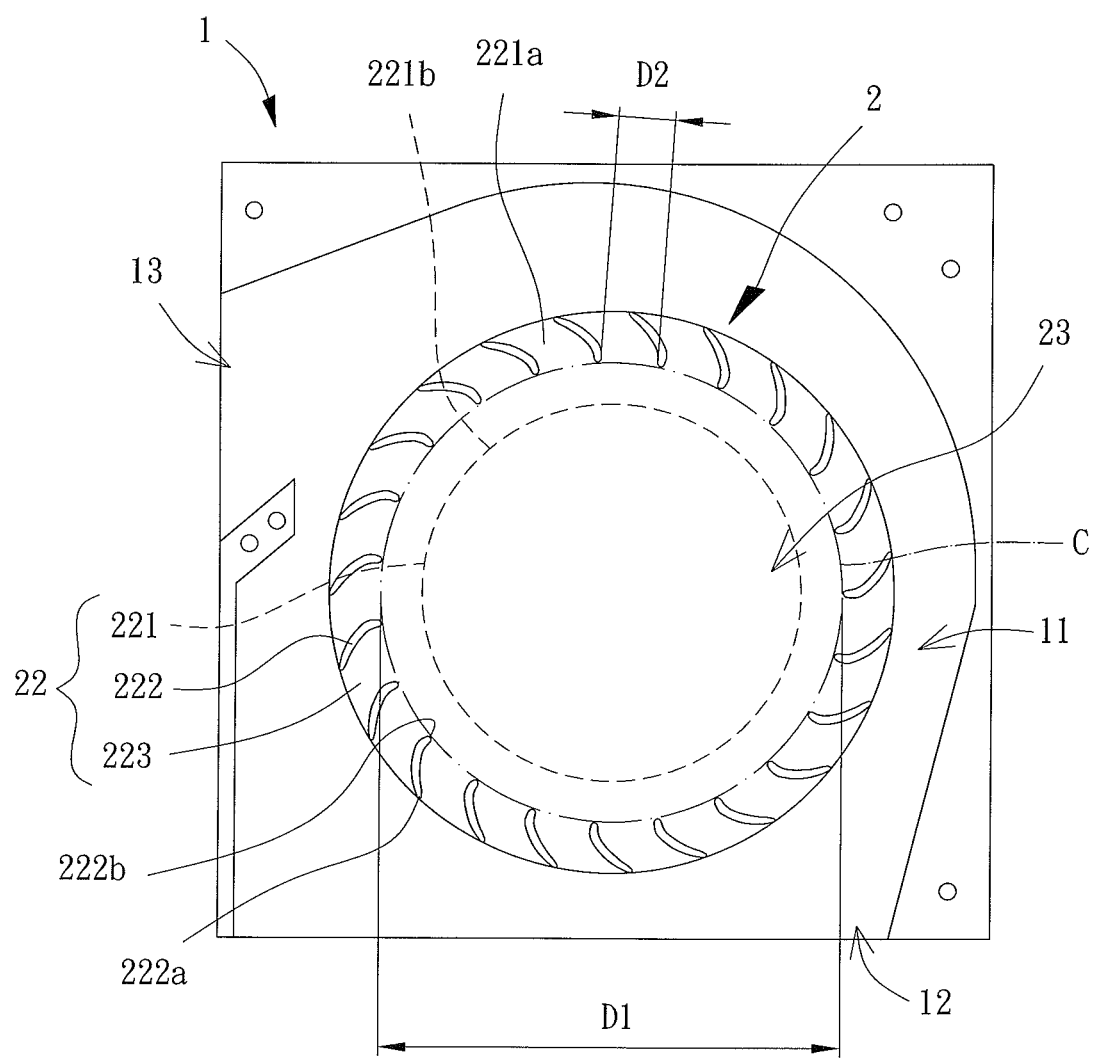
FIG. 9 is a top view of the fan with the different design.

Referring to FIGS. 7, 8 and 9, another fan with a different appearance from the fans of the first and second embodiments is disclosed. The fan has substantially the same structures as those of the first and second embodiments. Referring to FIG. 9, the second ends 222b of the blades 222 may jointly define a virtual geometric pattern C which can be of various regular or irregular shapes such as a circle, an ellipse or a polygon. An area encompassed by the virtual geometric pattern C is defined as the air-guiding room 23. The virtual geometric pattern C has a maximal diameter D1. A gap D2 is presented between the second ends 222b of two adjacent blades 222. The gap D2 is designed in a value smaller than the maximal diameter D1 of the virtual geometric pattern C, such that the air-guiding room 23 can have sufficient space for air to pass therethrough for an improved air-guiding effect. Thus, turbulence is avoided when the blades 222 of the impeller 22 drive air to pass through the at least one lateral air inlet 12 and the at least one lateral air outlet 13.

Furthermore, each blade 222 may have an axial cross section in an arcuate form (FIG. 10a) or with leftward and rightward arcuations (FIG. 10b). Alternatively, the axial cross section of the blade 222 can also have a varying thickness that is gradually-reduced from two ends to a middle thereof, as shown in FIGS. 10c and 10d. Alternatively, the axial cross section of the blade 222 can also be in the form of a thin triangle as shown in FIG. 10e. Based on these designs, a better air-driving ability can be provided.

Figure 11:
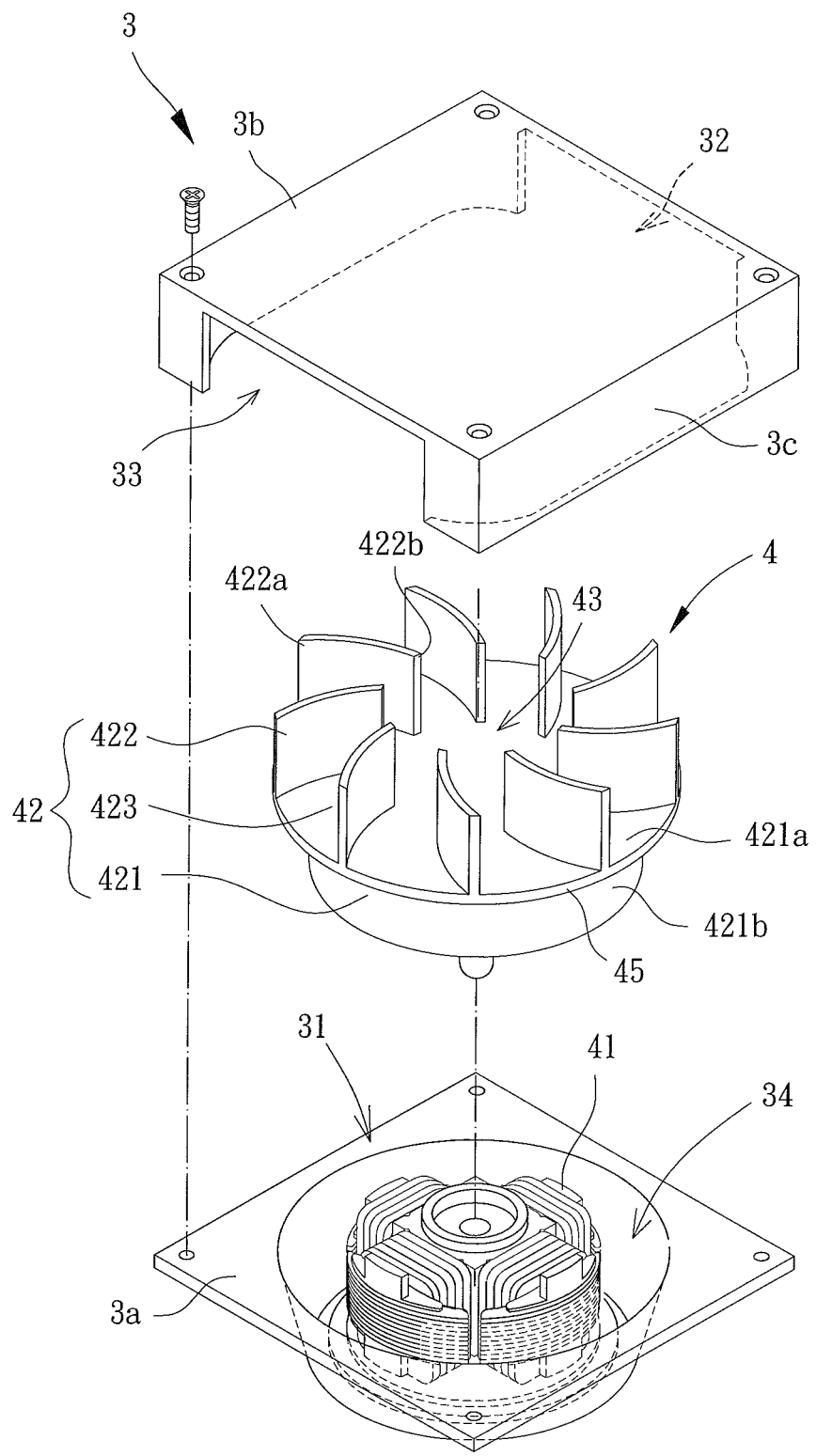
FIG. 11 is an exploded view of a fan having a lateral wall portion integrally formed with a cover portion thereof.

Referring to FIG. 11, taking the fan of the second embodiment as an example, the lateral wall portion 3c can be integrally formed with the cover portion 3b.

In summary, based on the air-guiding room 23, 43 and the blades 222, 422 that extend from the top face 223 of the hub 221 towards the cover portion 1b, 3b, turbulence can be efficiently prevented to improve the cooling efficiency of the fan.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A fan comprising:
    a housing having a compartment, at least one lateral air inlet and at least one lateral air outlet, wherein the at least one lateral air inlet and the at least one lateral air outlet communicate with the compartment, and wherein the housing is closed at a top and bottom; and
    a motor received in the compartment and having a stator and an impeller, wherein the impeller is rotatably coupled with the stator and comprises a hub and a plurality of blades, with the hub including a base plate having a top face, and a shaft terminating in the base plate and extending from the base plate opposite to the top face of the hub, with the plurality of blades coupled with the top face of the hub, wherein each of the plurality of blades has a first end and a second end arranged in a radial direction of the impeller, wherein the first ends of the plurality of blades face outwards, wherein the second ends of the plurality of blades jointly define an air-guiding room extending above the top face of the hub and encompassed by a virtual geometric pattern formed by a virtual line linking the second ends of the plurality of blades together, with airflow through the air guiding room not being blocked by the hub including the base plate and the shaft;
    wherein the virtual geometric pattern has a maximal diameter, wherein a gap is formed between the second ends of adjacent two of the plurality of blades, and wherein the gap is smaller than the maximal diameter of the virtual geometric pattern.

2. The fan as claimed in claim 1, wherein the housing comprises a cover portion and a lateral wall portion, wherein the cover portion and the lateral wall portion jointly define the compartment, wherein the top face of the hub faces the cover portion, wherein the blades axially extend from the top face of the hub towards the cover portion, and wherein the first ends of the plurality of blades face the lateral wall portion.

3. The fan as claimed in claim 2, wherein the at least one lateral air inlet has a height defined by a distance between the cover portion and the top face of the hub in an axial direction of the shaft of the impeller.

4. The fan as claimed in claim 3, wherein the at least one lateral air outlet has a height defined by a distance between the cover portion and the top face of the hub in the axial direction of the shaft of the impeller, wherein the at least one lateral air inlet and the at least one lateral air outlet in the lateral wall portion extend to the cover portion, with the top face of the hub and the cover portion delimiting a lateral flow path parallel to the cover portion in the compartment from the at least one lateral air inlet through the at least one lateral air outlet, with the at least one lateral air inlet and the at least one air outlet aligned in a plane perpendicular to the axial direction, with each of the plurality of blades being contained in the lateral flow path, and with the motor mounted outside of the lateral flow path.

5. The fan as claimed in claim 4, wherein the at least one lateral air inlet is radially aligned with the plurality of blades of the impeller.

6. The fan as claimed in claim 5, wherein the at least one lateral air outlet is radially aligned with the plurality of blades of the impeller.

7. The fan as claimed in claim 4, wherein the top face of the hub and the cover portion jointly define a radial air channel in which the plurality of blades are located.

8. The fan as claimed in claim 4, wherein the support portion has a chamber in the compartment, and wherein the stator and the hub of the impeller are received in the chamber.

9. The fan as claimed in claim 4, wherein the support portion is a base, wherein the lateral wall portion is in the form of a plurality of lateral walls interconnected and axially extending from a periphery of the base, wherein the cover portion is a cover plate coupled with the plurality of lateral walls, wherein the compartment is defined by the cover plate and the base, and wherein the at least one lateral air inlet and the at least one lateral air outlet are arranged on adjacent two of the plurality of lateral walls.

10. The fan as claimed in claim 4, wherein the support portion is a base, the lateral wall portion is in the form of a plurality of lateral walls interconnected and axially extending from a periphery of the base, wherein the cover portion is a cover plate coupled with the plurality of lateral walls, wherein the compartment is defined by the cover plate and the base, and wherein the at least one lateral air inlet and the at least one lateral air outlet are arranged on opposing two of the plurality of lateral walls.

11. The fan as claimed in claim 4, wherein the plurality of blades is integrally formed on the top face of the hub.

12. The fan as claimed in claim 4, wherein the virtual geometric pattern is in the form of a circle, an ellipse or a polygon.

13. The fan as claimed in claim 4, wherein the top face of the hub extends only in the radial direction.

14. The fan as claimed in claim 4, wherein the impeller further comprises a lateral peripheral wall extending from the base plate opposite to the top face of the hub.

15. The fan as claimed in claim 14, wherein the plurality of blades extends towards the lateral wall portion and extend beyond the lateral peripheral wall in the radial direction of the impeller.

16. The fan as claimed in claim 15, wherein each of the plurality of blades has a bottom edge, and wherein the bottom edges of the plurality of blades are connected together to form a bottom plate coupled with the hub.

* * * * *